United States Patent [19]

Sivalingam

[11] Patent Number: 4,800,782
[45] Date of Patent: Jan. 31, 1989

[54] ACCESSORY TRANSMISSION
[75] Inventor: Ramalingam Sivalingam, Mississauga, Canada
[73] Assignee: G.E. Machine Tool Limited, Brampton, Canada
[21] Appl. No.: 120,095
[22] Filed: Nov. 13, 1987

Related U.S. Application Data

[62] Division of Ser. No. 810,321, Dec. 17, 1985, Pat. No. 4,706,520.

[51] Int. Cl.$^4$ .................... F16H 3/44; F16H 57/10
[52] U.S. Cl. .................................................. 74/785
[58] Field of Search .................... 74/785, 768, 769

[56] References Cited

U.S. PATENT DOCUMENTS

| 811,327 | 1/1906 | Rivierre | 74/785 |
| 2,882,757 | 4/1959 | Edsall | 74/785 X |
| 3,295,394 | 1/1964 | Whateley | 74/785 X |
| 4,738,163 | 4/1988 | Anderson et al. | 74/785 |

FOREIGN PATENT DOCUMENTS 0038968 11/1981 European Pat. Off. ............. 74/785

Primary Examiner—Dirk Wright
Attorney, Agent, or Firm—Ridout & Maybee

[57] ABSTRACT

An accessory transmission for an automotive vehicle comprises a planetary gear set, a fixed cover and a cone clutch engageable with the ring gear of the planetary gear set or the cover to provide a direct drive or underdrive gear ratio in one embodiment, or a direct drive and overdrive gear ratio in another embodiment. The principles of the invention may also be applied to an embodiment wherein the ring gear rotation is governed by a one way brake as well as the cone clutch to provide both underdrive and overdrive transmissions.

8 Claims, 5 Drawing Sheets

ACCESSORY TRANSMISSION

This application is a division of application Ser. No. 810,321, filed Dec. 17, 1985 now U.S. Pat. No. 4,706,520.

This invention relates to an accessory drive or transmission associated with an engine. In particular, the invention provides a two speed accessory drive which may include a neutral gear ratio for driving engine accessories which in an automotive vehicle may include the alternator, water pump, power steering pump and air conditioner compressor. The invention may be adapted to provide an underdrive or overdrive gear ratio, which in either case provides a reduction ratio for the accessories at a selected increasing engine speed. The invention may provide any gear ratio which can be obtained using a planetary gear system. Typically, the invention is substituted for the engine crankshaft pulley of a vehicle, but may be made small enough to be substituted for a drive pulley of an accessory.

With the recent emphasis on energy conservation and fuel economy for automobiles, the need for the development of a suitable transmission for driving the accessories has presented itself. Running the accessories directly off of the crankshaft of the engine is inefficient at moderate to high engine speeds and in fact may cause damage to or reduce the life of the accessories. Thus, accessories driven directly by the engine must be made to withstand the abuse of high speed driving. Directly driving the accessories also results in a significant horsepower drain on the engine. A considerable amount of the available horsepower of the engine may be used to drive the accessories in a direct drive arrangement.

By providing an accessory transmission which enables the accessories to be driven at a reduced gear ratio at higher engine speeds relative to the drive mode at lower engine speeds, the available engine horsepower can be more efficiently employed. More of the available horsepower may be used for operation of the vehicle, thus improving vehicle performance. The efficiency provided by the invention will also result in fuel savings. Also, since at higher engine speeds the accessories are driven at relatively lower speeds compared to a direct drive arrangement, there will be less wearing forces applied thereto which should result in longer life for the accessories.

Problems facing car makers when developing an accessory transmission include the need to develop a device which is lightweight, simple, inexpensive and fully enclosed. It is quite desirable to have an accessory drive which was fully enclosed to the outside environment so that the drive mechanism is isolated from the adverse effects of rain, dust, corrosive agents and the like.

Another problem facing the designer of an accessory drive for an engine is the need to overcome the torsional effects transmitted to the gear system thereof from the engine input. The torsional effect is caused by the firing sequence of the engine and is higher in engines having a lower number of cylinders because each piston in the engine is required to contribute proportionally more to the rotation of the drive shaft when at a greater piston angle. For example, the piston angle in a four cylinder engine is 90°, whereas in an eight cylinder engine it is 45°. Because of the increased torsional effect associated with a four cylinder engine, the accessory drive will be noisy and the gear system will be subject to premature failure unless means for damping the torsional effect is provided.

Accordingly, the invention provides a sun gear held underdrive accessory transmission associated with an engine comprising, a planetary gear set comprising a sun gear having an integrally formed shaft, a plurality of planet gears positioned about and drivingly engaging the sun gear, a planet gear carrier, and a ring gear positioned about and drivingly engaging the planet gears, wherein said ring gear provides rotational input to the transmission from the vehicle engine. A fixed cover is provided for the transmission, and a cone clutch is slidably affixed on the shaft of the sun gear and has frustoconical working surfaces engageable with compatible surfaces of either the ring gear or the cover. Means are provided for sliding the cone clutch axially along the shaft of the sun gear. An output shaft is affixed to the planet gear carrier, and the sun gear is supported by a bearing about the output shaft. Preferably, especially in association with an engine in which the torsional effect causes excessive noise or rattling, a one way clutch with support bearings is positioned between the sun gear or ring gear and the output shaft which allows the output shaft to rotate only in the direction of engine rotation.

The invention also provides a sun gear held overdrive accessory transmission associated with an engine, comprising, a planetary gear set comprising a sun gear having an integrally formed shaft, a plurality of planet gears positioned about and drivingly engaging the sun gear, a planet gear carrier, and a ring gear positioned about and drivingly engaging the planet gears, wherein said ring gear provides rotational output from the transmission. A fixed cover is provided for the transmission, and a cone clutch is slidably affixed on the shaft of the sun gear and has frustoconical working surfaces engageable with compatible surfaces of either the ring gear or the cover. An input shaft for providing rotational input to the transmission from the vehicle engine is affixed to the planet gear carrier, and the ring gear is supported by a bearing about the input shaft. Preferably, especially in association with an engine in which the torsional effect causes excessive noise or rattling, a one way clutch with support bearings is positioned between the ring gear and the input shaft which allows the ring gear to rotate only in the direction of engine rotation. In addition, the one way clutch carries the torque when the output speed equals the input speed.

Employing the principles of the invention, a ring gear held underdrive accessory transmission associated with an engine is provided, comprising a planetary gear set comprising a sun gear, a plurality of planet gears positioned about and drivingly engaging the sun gear, a planet gear carrier having an integrally formed shaft for providing rotational output from the transmission, and a ring gear positioned about and drivingly engaging the planet gears. An input shaft provides rotational input to the transmission from the engine, said sun gear being affixed about the input shaft, and said gear carrier being supported about the input shaft by a bearing. A cone clutch is slidably affixed on the shaft of the planet gear carrier and is capable of movement axially along the shaft, the clutch having a frustoconical working surface engageable with a compatible surface of the ring gear. Means are provided for sliding the cone clutch axially along the shaft of the gear carrier, and a fixed cover for the transmission is supported about the shaft of the gear carrier by a bearing, and about the ring gear by a one way clutch and bearings, said one way clutch allowing the ring gear to rotate only in the direction of engine rotation.

Similarly the invention provides a ring gear held overdrive accessory transmission associated with an engine, comprising a planetary gear set comprising a sun gear, a plurality of planet gears positioned about and drivingly engaging the sun gear, a planet gear carrier having an integrally formed shaft for providing rotational input from the engine, and a ring gear positioned about and drivingly engaging the planet gears. An output shaft provides rotational output from the transmission, said sun gear being affixed about the output shaft, and said gear carrier being supported about the output shaft by a bearing. A cone clutch is slidably affixed on the shaft of the planet gear carrier and is capable of movement axially along the shaft, the clutch having a frustoconical working surface engageable with a compatible surface of the ring gear. Means are provided for sliding the cone clutch axially along the shaft of the gear carrier, and a fixed cover for the transmission is supported about the shaft of the carrier by a bearing, and about the ring gear by a one way brake bearings, said one way brake allowing the ring gear to rotate only in the direction of engine rotation.

Preferred embodiments of the invention will be described with reference to the drawings in which.

Figure 1:
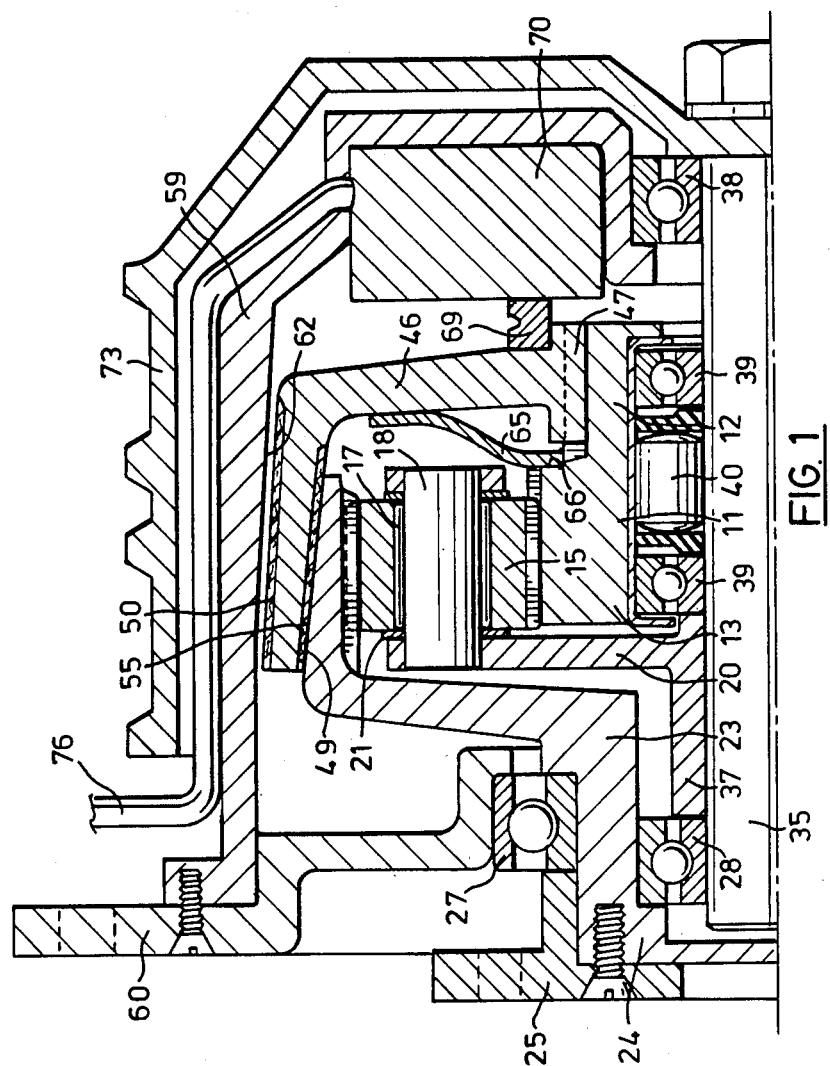
FIG. 1 is a quarter sectional view of a sun gear held underdrive transmission in accordance with the invention.

Referring to FIG. 1, a preferred underdrive transmission is illustrated comprising a planetary gear set having a sun gear 11 with a shaft 12 and a sun wheel 13. A plurality of planet gears 15 are positioned about the sun gear 11 and are in driving engagement therewith. Each planet gear 15 is rotatably supported about a needle bearing 17 on a shaft 18 which is carried by a planet carrier 20. Thrust washers 21 are provided on either side of each planet gear 15 to keep each planet gear 15 in axial position on the shaft 18. A ring gear 23 is positioned about and is in driving engagement with the planet gears 15. The ring gear 23 has an integrally formed shaft 24 which is directly connected to the crankshaft or drive of the engine through an input member 25. Rotation of the ring gear 23 is supported by ball bearings 27 and 28. The bearing 28 is optional.

The planet gear carrier 20 is firmly attached to an output shaft 35 by means of a central cylindrical portion 37 formed integrally with the planet carrier 20. Thus, rotation of the planet carrier 20 provides rotation to the output shaft 35. Rotation of the shaft 35 is supported by ball bearings 28, 38 and 39.

Preferably, the sun gear 11 is supported axially and radially about the output shaft 35 by ball bearings 39 which preferably form a part of a one way clutch assembly 40. The one way clutch 40 is of a type well known in this art, and the clutch 40 is provided with internal rollers which carry the torque from the shaft 35. The clutch 40 allows the output shaft 35 to rotate only in the direction of engine rotation and prevents counter rotation. The one way clutch 40, therefore, provides a damping of the torsional effect from the engine thereby addressing one of the aforementioned problems. Where the torsional effect is not a problem, the clutch 40 may be eliminated. Of course, a single or double bearing 39 would in any case be required to take the axial and radial load about the shaft 35. It should also be apparent to the skilled person that the one way clutch 40 and bearings 39 may be positioned between the shaft 35 and the ring gear 23.

A cone clutch 46 is slidably attached to the shaft 12 of the sun gear 11. This attachment is preferably accomplished by providing splines longitudinally in the shaft along which teeth 47 about the hub of the clutch 46 may slide. The cone clutch 46 has frustoconical working surfaces 49 and 50. The inner surface 49 may engage a compatibly shaped outer surface 55 of the ring gear 23 by causing the cone clutch 46 to slide along the shaft 12 toward the ring gear 23.

A first cover portion 59 is provided about the transmission, and is sealingly joined to a second cover portion 60 which is fixed in pace preferably by bolting it to the engine block. The cover 59 has an inner surface 62 which is compatibly shaped with the outer frustoconical surface 50 of the cone clutch 46. The outer surface 50 may engage the inner surface 62 of the cover 59 by causing the clutch 46 to slide along the shaft 12 of the sun gear 11 away from the ring gear 23.

Movement of the cone clutch 46 along the shaft 12 of the sun gear 11 may be accomplished in a number of ways. A preferred means for activating the cone clutch 46 is shown in FIG. 1. A spring 65 is provided between a stepped portion 66 of the sun gear shaft 12 and the cone clutch 46 which provides the force for pushing the clutch 46 into engagement with the cover 59. In opposition to the spring 65 is preferably a hydraulically activated annular thrust bearing 69. The bearing 69 is operated by an annular hydraulic actuator 70 and causes the cone clutch 46 to move along the shaft 12 into engagement with the ring gear 23. It will be apparent to those skilled in this art that actuation of the cone clutch 46 may be accomplished, for example, by an actuator 70 having a built in rotating element (not shown) for moving the cone clutch 46 axially along the shaft 12. Of course, electromechanical actuator means or other known means may be used to activate the cone clutch 46. In application where the neutral gear ratio of the transmission is important, an electromechanical actuator 70 would likely be preferred.

The underdrive transmission shown in FIG. 1 has three modes of operation all of which are governed by the location of the cone clutch 46 relative to the cover 59 and the ring gear 23. For the purpose of driving accessories such as the alternator, water pump, power steering pump and air conditioner compressor, the output shaft 35 is attached to a pulley 73 capable of receiving the required number of belts to run the various accessories.

At low engine revolutions (see FIG. 5), the accessory transmission may provide a direct drive from the engine to the output shaft 35 and pulley 73 by causing the cone clutch 46 to engage the ring gear 23. This is accomplished by triggering the hydraulic actuator 70 to extend the thrust bearing 69 which pushes the cone clutch 46 along the shaft 12 of the sun gear 11 so that the clutch 46 engages the ring gear 23 at the frictional engagement of the opposing surfaces 49 and 55. This arrangement of components tends to cause the planetary gear set, comprising the sun gear 11, planet gears 15, planet carrier 20 and ring gear 23 to rotate as a unit to directly transmit the rotational input from the ring gear 23 to the planet carrier 20 and hence, to the output shaft 35 and the pulley 73.

Figure 5:
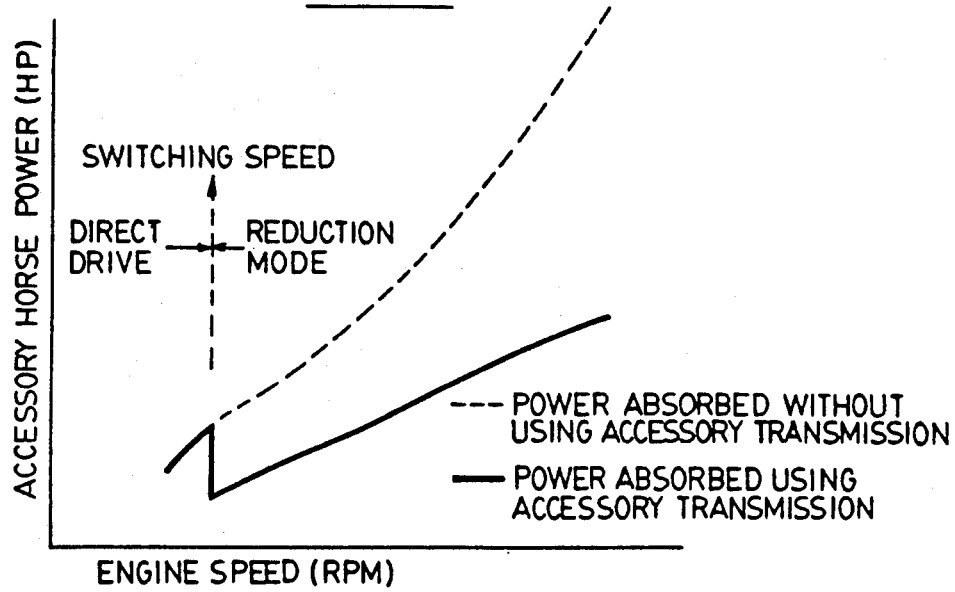
FIGS. 5 and 6 are graphs showing horsepower savings using the invention.

A second mode of operation is provided for higher engine revolutions and is an underdrive or reduced gear ratio (see FIG. 5). The purpose of providing a reduced gear ratio for the transmission output is the recognition that at higher engine revolutions, the accessories do not require proportionally as much power to operate as is the case at lower revolutions. Also, the drain on engine power by the accessories is in excess of their actual power requirements at higher engine revolutions and is thus, not fuel efficient.

The actual engine speed at which the underdrive mode of operation is initiated depends on a number of variables specific to the particular application as will be appreciated by those skilled in this art. Generally in association with an automobile, the underdrive mode will be activated in the 800 to 1600 rpm range for the engine. This mode of operation is accomplished by causing the activator 70 to release the thrust bearing 69 and allow the cone clutch 46 to disengage the ring gear 23 under the influence of the force from the spring 65. The spring 65 causes the cone clutch 46 to engage the stationary cover 59 so that the surface 50 of the clutch 46 and the surface 62 of the cover 59 come into a firm frictional engagement. This arrangement of components causes the sun gear 11 to cease rotation and the input through the ring gear 23 is then subjected to the gear reduction provided by the planet gears 15 which is in turn transmitted to the output shaft 35 through the planet gear carrier 20.

As will be apparent to those skilled in this art, the invention provides any gear ratio which may be achieved by a planetary gear set. Therefore, the present transmission is suitable for a wide variety of applications and may be adapted for use in association with virtually any known automotive engine and combination of accessories. Also, it should be clear that the invention is not intended to be limited to automotive applications.

A neutral mode of operation wherein rotational energy from the engine is not transmitted to the output shaft 35 is provided when the cone clutch 46 is positioned between the ring gear 23 and the cover 59. The neutral mode of operation requires regulation of the axial movement of the cone clutch 46 by the actuator 70. This regulation may be more easily accomplished by an electomechanical actuator 70. The neutral mode is provided for use in association with an accessory which is not constantly used, such as an air conditioner.

Smooth operation of the transmission is provided by the operation of the actuator 70 and the friction surfaces 49 and 50 of the cone clutch 46. Well known means (not shown) are used to monitor the rotational speed of the engine and to cause hydraulic fluid to be pumped into or out of the actuator 70 through a line 76 for a smooth operation of the cone clutch 46. Likewise, the torsional vibration provided to the input of the transmission from the firing sequence of the engine cylinders is eliminated by the one way clutch 40 located between the sun gear 11 and output shaft 35. This is a particularly preferred addition to the transmission in association with four cylinder engines in which the torsional effect is especially pronounced. Suitable one way clutches for this type of application are well known in the art and may comprise a cylindrical housing having an internal needle bearing wherein the individual rollers are mechanically disposed to rotate in one direction only. The one way clutch 40 prevents counterrotation of the output shaft 35, thereby damping the input torsional effect. In addition to reducing the noise or rattle of the transmission caused by the torsional effect, the one way clutch 40 serves to protect the planetary gear set from premature wear and damage to the gear teeth which otherwise would result from a marked torsional effect.

Figure 2:
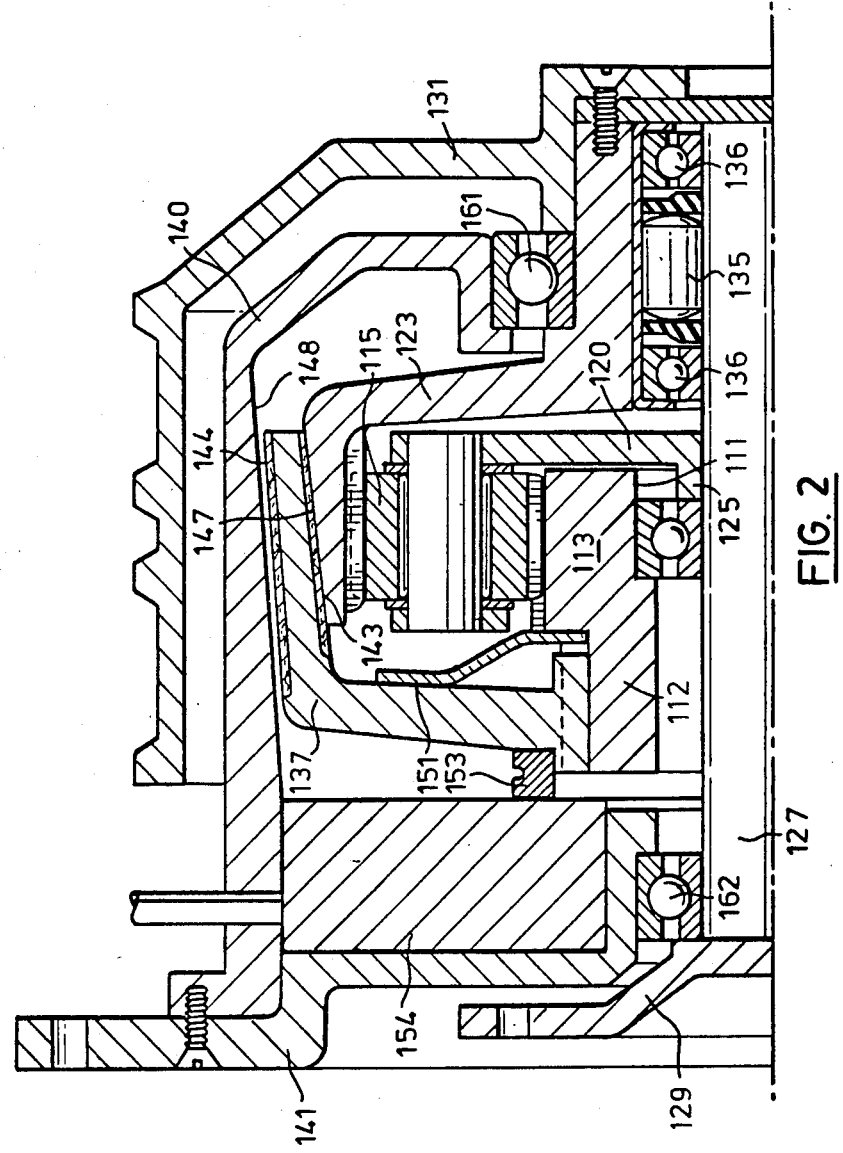
FIG. 2 is a quarter sectional view of a sun gear held overdrive transmission in accordance with the invention.

Having an understanding from the foregoing description of the construction and operation of the underdrive transmission of the invention, FIG. 2 illustrates the invention as applied to an overdrive accessory transmission As with the underdrive transmission, the transmission shown in FIG. 2 has a planetary gear set comprising a sun gear 111 having a shaft 112 and a sun wheel 113, a plurality of planet gears 115, a planet gear carrier 120 and a ring gear 123. In this case, however, the planet gear carrier 120 is attached by means of a cylindrical portion 125 to an input shaft 127. The input shaft 127 is connected directly to the engine through an input member 129.

The output of the transmission shown in FIG. 2 is through the ring gear 123 to a pulley 131 affixed thereto Preferably, a one way clutch 135 and support bearings 136 are provided between the ring gear 123 and the input shaft 127, the clutch 135 carrying the torque from the engine and providing damping of the aforementioned torsional effect, and the bearings 136 providing axial and radial support about the shaft 127. As with the underdrive transmission, a cone clutch 137 is splined onto the sun gear shaft 112. A first cover portion 140 is provided about the transmission, and the cover 140 is sealingly affixed to a second cover portion 141. The first portion 140 is supported about the ring gear 123 by a bearing 161, and the second portion 141 is supported about the shaft 127 by a bearing 162. The cover members 140 and 141 are fixed in place by bolting to the engine block.

The cone clutch 137 has frustoconical friction or working surfaces 143 and 144 which are engageable with a compatible surface 147 of the ring gear 123 or 148 of the cover 140. The cone clutch 140 may be slid longitudinally along the shaft 112 of the sun gear 111 by means of a spring 151 or a thrust bearing 153 opposing the spring 151 and operated by an actuator 154.

In contrast to the underdrive embodiment, the transmission shown in FIG. 2 has only two modes of operation, namely overdrive and direct drive modes. In the overdrive mode, the output rotation at the pulley 131 is greater than that of the input at the shaft 127. In the direct drive mode, the input and output rotational speeds are equal. A neutral mode may be obtained by elimination of the one way clutch 135.

The high gear or overdrive mode of operation occurs when the cone clutch 137 is engaged with the cover 140 so that the opposing surfaces 144 and 148 make firm frictional contact. This causes the sun gear 111 to be the stationary member of the planetary gear set so that a stepped up gear ratio is provided to the ring gear 123.

The direct drive mode is provided by causing the actuator 154 to extend the thrust bearing 153 against the cone clutch 137 thereby sliding it along the sun gear shaft 112 against the force of the spring 151 to disengage the clutch 137 from the cover 140. The preferred embodiment of the invention includes the one way clutch 135 for carrying the torque from the input shaft 127. In the overdrive transmission shown in FIG. 2, the disengagement of the cone clutch 137 from the cover 140 causes the ring gear 123 to begin losing rotational speed under the load of the accessories. As the ring gear 123 slows down to the speed of the input shaft 127, the one way clutch 135 locks these input and output members together to provide a direct drive mode of operation. The engagement of the cone clutch 137 with the ring gear 123 provides additional support to the rotation of the planetary gear set as a unit. Clearly, the use of the one way clutch 135 enables the cone clutch 137 to provide a secondary function when engaging the ring gear 123, that is, the cone clutch 137 holds the sun gear 111 and the ring gear 123 together, thereby preventing vibration and allowing smooth rotation of the gear set as a unit. Without the inclusion of the one way clutch 135, the cone clutch 137 must be moved into firm engagement with the ring gear 123 at the opposing surfaces 143 and 147.

Figure 6:
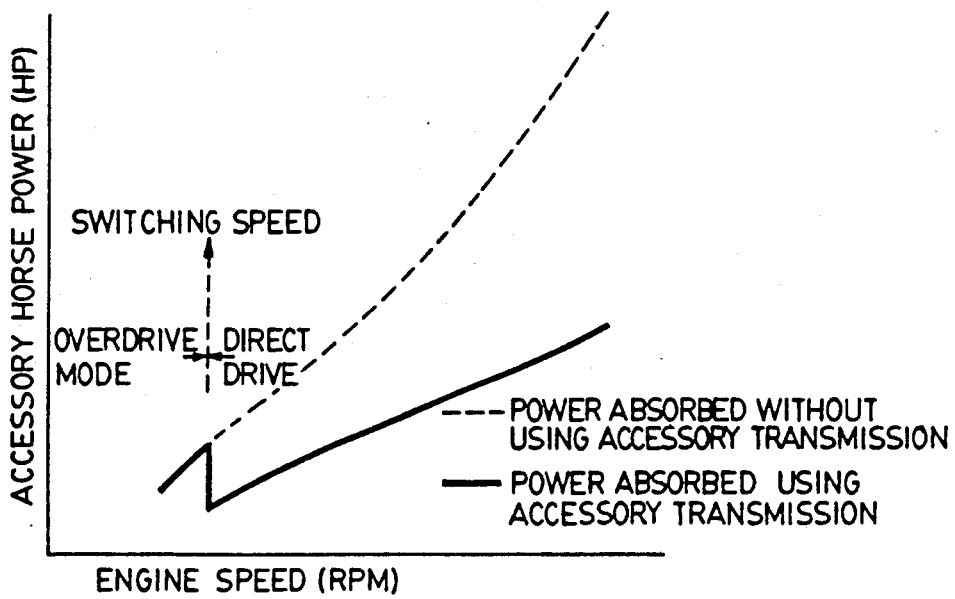

As can be seen from the foregoing, the geared down mode of operation in the overdrive transmission is provided in the direct drive mode. Thus, at lower engine revolutions, the overdrive transmission is in the overdrive mode (see FIG. 6) which by adjustment of the pulley sizes approximates the power transmission to the accessories obtainable at low engine speeds without use of the invention. At the switching speed when the engine is in the overdrive mode, the actuator 154 causes the cone clutch 137 to disengage the cover 140 to give a direct drive configuration which, in effect, is a gear reduced mode As seen in FIG. 2, the one way clutch 135 is positioned between the input shaft 127 and the ring gear 123. The clutch 135 allows the ring gear 123 to rotate faster than the shaft 127, but locks the ring gear 123 when its speed is reduced to that of the shaft 127. Clearly, the one way clutch 135 also prevents any tendency for the ring gear 123 to counterrotate due to the engine torsional effect The principles of the invention may also be expressed by governing the rotation of the ring gear by means of a one way clutch rather than the cone clutch. In these embodiments shown in FIGS. 3 and 4, the gear reduction or enhancement is achieved by holding the ring gear stationary rather than in the previously discussed embodiments wherein the sun gear was held stationary.

Figure 3:
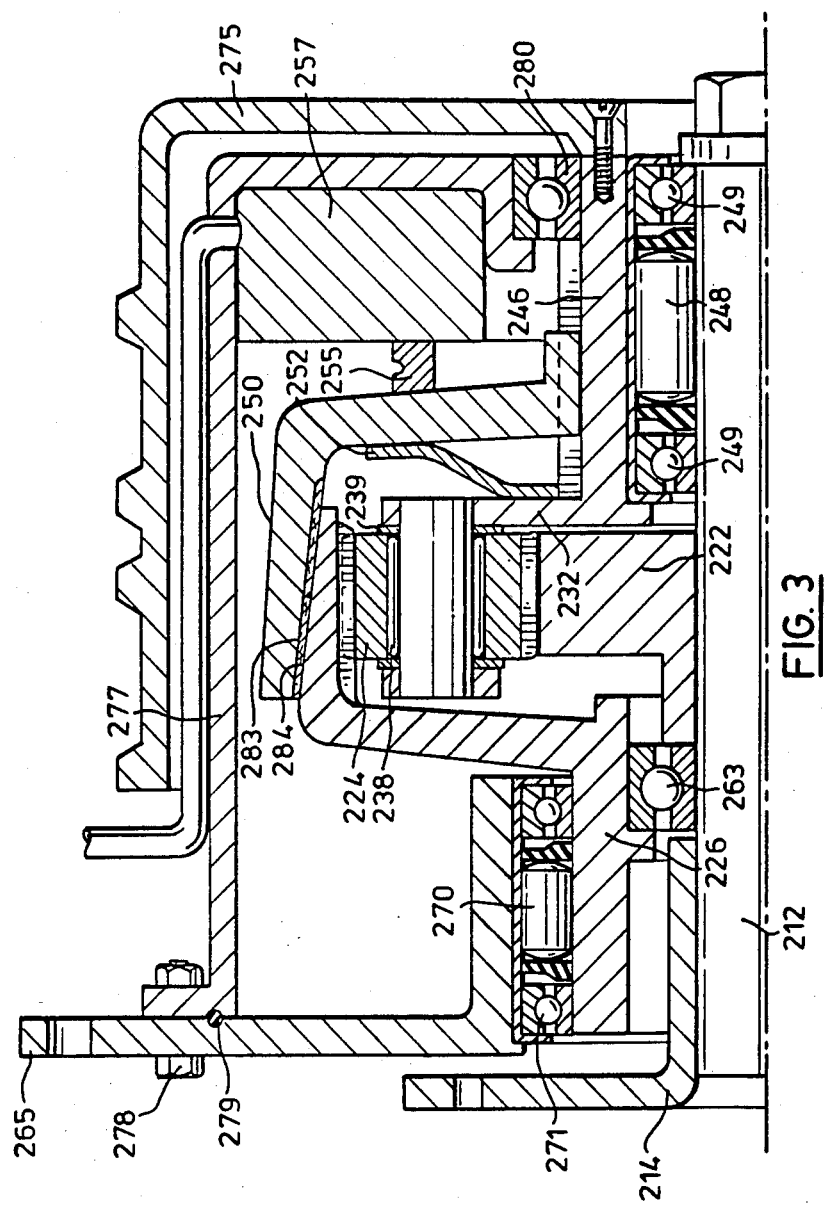
FIG. 3 is a quarter sectional view of a ring gear held underdrive transmission in accordance with the invention.

The embodiment of the invention shown in FIG. 3 is an underdrive accessory transmission having an input shaft 212 connected to the engine drive by means of a flanged attachment means 214. A planetary gear set is provided comprising, a sun gear 222 affixed to and driven by the shaft 212, a plurality of planet gears 224 positioned about and in driving engagement with the sun gear 222, and a ring gear 226 positioned about and in driving engagement with the planet gears 224.

The planet gears 224 are supported by a planet gear carrier 232 having a pin 236 and needle bearing 238 for each planet gear 224. Thrust washers 239 are provided about each planet gear 224 to inhibit axial movement of the gears 224 on the pins 236. The planet carrier 232 is supported by a cylindrical portion 246 formed integrally therewith about a one way clutch 248 and bearings 249 provided about the shaft 212. The preferably integrally formed bearing portions 249 of the clutch 248 provides axial and radial support for the planet gear carrier 232 about the shaft 212. The one way clutch 248 only allows rotation of the shaft 212 in the direction of engine rotation. This clutch 248 performs the same function as the clutch 40 shown in FIG. 1, i.e., it damps the torsional effects of the engine, and as with the clutch 40, the clutch 248 may also be positioned between the shaft 212 and the ring gear 226.

The cylindrical portion 246 of the carrier 232 is splined to allow movement of a cone clutch 250 axially along it under the opposing influences of a spring 252 and a thrust bearing 255. The thrust bearing 255 is controlled preferably by an annular hydraulic actuator 257.

The ring gear 226 is supported about the input shaft 212 by a bearing 263 which allows the shaft 212 to rotate relative the ring gear 226. A first cover member 265 is supported relative to the ring gear 226 by a one way clutch 270 and support bearings 271. The clutch 270 allows the ring gear 226 to rotate in the direction of engine rotation only, and the bearings 271 provide axial and radial support for the ring gear 226 about the cover member 265.

In this embodiment, the output is the planet gear carrier 232, and a pulley 275 is affixed to the cylindrical portion 246 of the carrier 232. A second cover member 277 is sealingly joined to the first cover member 265 such as by bolts 278 and an 0-ring 279, and is supported about the output cylindrical portion 246 by a bearing 280.

This ring gear held underdrive unit has a direct drive mode of operation wherein the output pulley 275 rotates at the speed of the input shaft 212, and a gear reduced mode of operation wherein the pulley 275 rotates at a speed less than that of the input shaft 212.

The direct drive mode is provided when the cone clutch 250 engages the ring gear 226 by causing the thrust bearing 255 to slide the clutch 250 axially along the cylindrical portion 246 of the planet gear carrier 232. In this regard, the cone clutch 250 is provided with a frictional working surface 283 which is engageable with a compatible outer surface 284 of the ring gear 226. Engagement of the cone clutch 250 and the ring gear 226 causes the locking together of the ring gear 226 and planet gear carrier 232 thereby causing the planet gear system to rotate as a unit.

At the desired switching speed, during engine acceleration, the actuator 257 releases the thrust bearing 255 allowing the cone clutch 250 to disengage the ring gear 226 under the influence of the spring 252. The ring gear 226 is prevented from counterrotation by means of the one way clutch 270 and is, therefore, held stationary. The planet gear system is then able to provide a gear reduction from the sun gear 222 input to the planet gear carrier 232 output. The one way clutch 248 prevents counterrotation of the input shaft 212 thereby damping the torsional effect.

It will be noted that because the various members comprising a gear, sun gear and planet gear carrier, the principle of operation of the embodiment shown in FIG. 3 is closely akin to that of the embodiment shown in FIG. 1. It is the use of clutch means to lock up two members of the planetary gear set which provides the direct drive mode, and the locking of the sun or the ring gear which provides the gear reduced mode.

Figure 4:
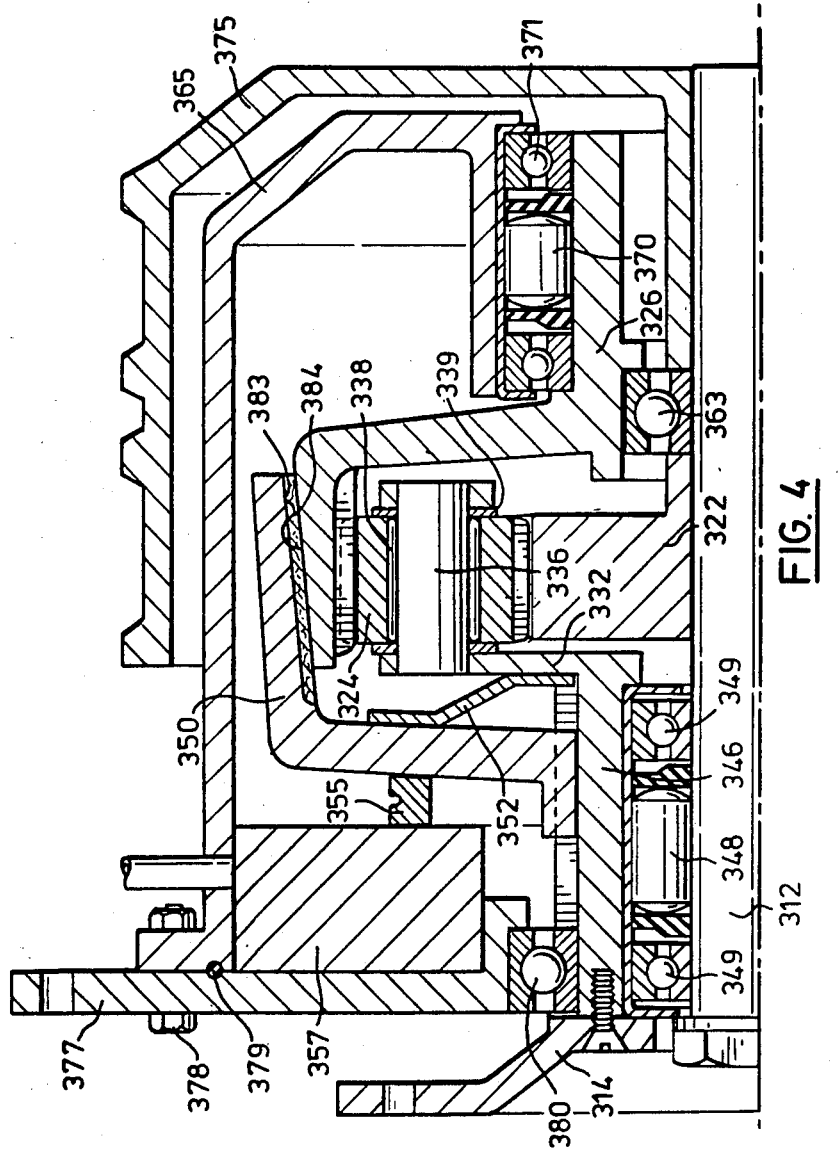
FIG. 4 is a quarter sectional view of a ring gear held overdrive t in accordance with the invention.

Referring to the embodiment shown in FIG. 4, a ring gear held overdrive configuration is set out. The components for the overdrive transmission shown in FIG. 4 are the same as for the underdrive embodiment of FIG. 3 with the input and output members being reversed. Thus, the output of the transmission shown in FIG. 4 is the shaft 312 and the input is provided through the planet gear carrier 332 by its attachment to the engine drive by means of an annular member 314.

A planetary gear set is provided, comprising a sun gear 322 affixed to the output shaft 312, a plurality of planet gears 324 positioned about the sun gear 322, and a ring gear 326 about the planet gears 324. The planet gears 324 are supported by a planet carrier 332 having a pin 336, needle bearing 338 and thrust washers 339 for each planet gear 324. The planet carrier 332 is provided with an integrally formed cylindrical portion 346 being supported about the shaft 312 by means of a one way clutch 348 and bearings 349. The integrally formed bearing portions 349 of the clutch 348 provides axial and radial support for the planet gear carrier 332 about the shaft 312. The one way clutch 348 serves to damp the torsional effects of the engine by preventing counterrotation of the shaft 312.

The cylindrical portion 346 of the carrier 332 is splined to allow axial movement of a cone clutch 350 along it under the opposing influences of a spring 352 and a thrust bearing 355. The thrust bearing 355 is preferably controlled by an annular hydraulic actuator 357.

The ring gear 326 is supported about the shaft 312 by a bearing 363 which allows the shaft 312 to rotate relative the ring gear 326. A first cover member 365 is supported relative to the ring gear 326 by a one way brake 370 and bearings 371. The brake 70 allows the ring gear 326 to rotate in the direction of engine rotation only, and the bearing portion 371 of the brake 370 provides axial and radial support for the cover member 365 about the ring gear 326.

In this embodiment, the output is the shaft 312, and a pulley 375 is affixed thereto. A second cover member 377 is sealingly joined to the first cover member 365 such as by bolts 378 and an O-ring 379, and is supported about the input cylindrical portion 46 by a bearing 380.

This ring gear held drive unit has a direct drive mode of operation wherein the output pulley 375 rotates at the speed of the input planet gear carrier 332, and a high gear mode of operation wherein the pulley 375 rotates at a speed greater than that of the input shaft 312.

The direct drive mode is provided by engaging the cone clutch 350 and the ring gear 326 by causing the thrust bearing 355 to slide the clutch 350 axially along the cylindrical portion 346 of the planet gear carrier 332. In this regard, the cone clutch 350 is provided with a frictional working surface 383 which is engageable with a compatible outer surface 384 of the ring gear 326. Engagement of the cone clutch 350 and the ring gear 326 causes the locking together of the ring gear 326 and planet gear carrier 332 thereby causing the planet gear system to rotate as a unit.

At the desired switching speed, the actuator 357 releases the thrust bearing 355 allowing the cone clutch 350 to disengage the ring gear 326 under the influence of the spring 352. The ring gear 326 is prevented from counterrotation by means of the one way brake 370 and is thus, held stationary. The planet gear system is then able to provide a stepped up gear ratio from the gear carrier 332 input to the output shaft 312.

As explained above with respect to the embodiment shown in FIG. 2, this ring gear held overdrive transmission will provide an overdrive gear ratio at lower engine speeds and switch to the gear reduced direct drive mode at higher engine speeds. The switching point will depend on a variety of factors which will be apparent to the skilled person.

The description of the preferred embodiments of the invention has been made with reference to the automobile application. However, it should be understood that the invention is not so limited and has application to a variety of situations where accessories or the like are driven by an engine.

I claim:

1. An overdrive accessory transmission associated with an engine, comprising:
   a planetary gear set comprising a sun gear, a plurality of planet gears positioned about and drivingly engaging the sun gear, a planet gear carrier having an integrally formed shaft for providing rotational input from the engine, and a ring gear positioned about and drivingly engaging the planet gears;
   an output shaft for providing rotational output from the transmission, said sun gear being affixed about the output shaft, and said gear carrier being supported about the output shaft by a bearing;
   a cone clutch slidably affixed in the shaft of the planet gear carrier and being capable of movement axially along the shaft, the clutch having a frustoconical working surface engageable with a compatible surface of the ring gear;
   means for sliding the cone clutch axially along the shaft of the gear carrier; and
   a fixed cover for the transmission being supported about the shaft of the gear earlier by a bearing, and about the ring gear by a one way brake and support bearings, said one way brake allowing the ring gear to rotate only in the direction of engine rotation.

2. A transmission as claimed in claim 1, wherein the cover comprises a first portion supported by said one way clutch and bearing about the ring gear, and a second portion affixed to the first portion and being supported about the gear carrier by a bearing.

3. A transmission as claimed in claim 1, wherein the means for sliding the cone clutch comprise a spring positioned between the gear carrier and cone clutch for biasing the clutch toward disengagement with the ring gear, and an actuator having a thrust bearing positioned in opposition to said spring, the thrust bearing being capable of sliding the clutch into firm engagement with the ring gear in opposition to the spring force.

4. A transmission as claimed in claim 3, wherein the actuator is hydraulic.

5. A transmission as claimed in claim 3, wherein the actuator is electromechanical.

6. A transmission as claimed in claim 1, wherein the ring gear is supported about the input shaft by a bearing.

7. A transmission as claimed in claim 1, further comprising thrust washers positioned at each end of each planet gear to restrict the axial movement thereof.

8. A transmission as claimed in claim 1, further comprising a second one way clutch and support bearings being positioned between the gear carrier and the output shaft, the clutch allowing the shaft to rotate only in the direction of engine rotation.

* * * * *